US008620732B2

(12) United States Patent
Roberts et al.

(10) Patent No.: US 8,620,732 B2
(45) Date of Patent: Dec. 31, 2013

(54) METHOD AND SYSTEM FOR PRESENTING BANNERS HAVING DIRECT LINK TO USER PROFILE INFORMATION

(75) Inventors: Greg Roberts, Alpharetta, GA (US); Scott Wills, Mountain View, CA (US)

(73) Assignee: Catalina Marketing Corporation, St. Petersburg, FL (US)

( * ) Notice: Subject to any disclaimer, the term of this patent is extended or adjusted under 35 U.S.C. 154(b) by 2194 days.

(21) Appl. No.: 10/937,367

(22) Filed: Sep. 10, 2004

(65) Prior Publication Data

US 2005/0216336 A1    Sep. 29, 2005

Related U.S. Application Data

(60) Provisional application No. 60/501,855, filed on Sep. 11, 2003.

(51) Int. Cl.
*G06Q 30/00* (2012.01)

(52) U.S. Cl.
USPC ........................................................ 705/14.1

(58) Field of Classification Search
USPC .................................................. 705/14, 14.1
See application file for complete search history.

(56) References Cited

U.S. PATENT DOCUMENTS

| | | | |
|---|---|---|---|
| 3,632,995 A | 1/1972 | Wilson | 235/61.12 N |
| 4,554,446 A | 11/1985 | Murphy et al. | 235/487 |
| 4,674,041 A | 6/1987 | Lemon et al. | 364/401 |
| 5,004,270 A | 4/1991 | Schaul et al. | 283/48.1 |
| 5,176,224 A | 1/1993 | Spector | 186/52 |
| 5,185,695 A | 2/1993 | Pruchnicki | 364/401 |
| 5,214,793 A | 5/1993 | Conway et al. | 455/49.1 |
| 5,249,044 A | 9/1993 | Von Kohorn | 358/86 |
| 5,285,278 A | 2/1994 | Holman | 358/142 |
| 5,287,181 A | 2/1994 | Holman | 348/473 |
| 5,308,120 A | 5/1994 | Thompson | 283/70 |
| 5,353,218 A | 10/1994 | De Lapa et al. | 364/401 |
| 5,501,491 A | 3/1996 | Thompson | 283/70 |
| 5,627,549 A | 5/1997 | Park | 342/357 |
| 5,684,859 A | 11/1997 | Chanroo et al. | 379/58 |
| 5,822,735 A | 10/1998 | De Lapa et al. | 705/14 |
| 5,844,221 A | 12/1998 | Madigan, Jr. et al. | 235/383 |
| 5,845,259 A | 12/1998 | West et al. | 705/14 |

(Continued)

OTHER PUBLICATIONS

Newcomb, Kevin, "Google Seeks Patent for Targeting Ads on Wi-Fi Hotspots", *ClickZ*, Mar. 24, 2006, printed from <http://www.clickz.com/3593971>, 1 page.

*Primary Examiner* — Daniel Lastra
(74) *Attorney, Agent, or Firm* — Pillsbury Winthrop Shaw Pittman LLP

(57) ABSTRACT

A method and system for generating electronic advertisement, such as banner ads, based on user profile information and other information are disclosed. An online promotion service may receive profile information, location information and other information from a user. The user may also define a proximity preference which may include a range of distance the user is willing to travel to redeem one or more promotions. A service or product provider or other authorized entity may define a proximity preference which may include a target range of advertisement exposure. The online promotion service may present advertisements for incentives and other promotions based on user profile information as well as proximity preference information where the proximity preference is defined by the user, the provider, or both. The user may activate a user identifier displayed on the advertisement which provides a direct link to user profile information to enable the user to easily and quickly modify and update user profile information.

45 Claims, 12 Drawing Sheets

(56) References Cited

U.S. PATENT DOCUMENTS

| | | | |
|---|---|---|---|
| 5,852,775 A | 12/1998 | Hidary | 455/404 |
| 5,855,007 A | 12/1998 | Jovicic et al. | 705/14 |
| 5,865,470 A | 2/1999 | Thompson | 283/70 |
| 5,969,678 A | 10/1999 | Stewart | 342/457 |
| 6,014,090 A | 1/2000 | Rosen et al. | 340/905 |
| 6,041,308 A | 3/2000 | Walker et al. | 705/14 |
| 6,571,279 B1 | 5/2003 | Herz et al. | 709/217 |
| 6,647,269 B2 | 11/2003 | Hendrey et al. | 455/456 |
| 7,376,591 B2 | 5/2008 | Owens | 705/26 |
| 2001/0051901 A1 | 12/2001 | Hager et al. | 705/26 |
| 2002/0042819 A1 | 4/2002 | Reichert et al. | 709/217 |
| 2002/0087384 A1 | 7/2002 | Neifeld | 705/10 |
| 2002/0095340 A1 | 7/2002 | Vermande | 705/14 |
| 2002/0165967 A1* | 11/2002 | Morgan | 709/227 |
| 2002/0194069 A1 | 12/2002 | Thakur et al. | 705/14 |
| 2003/0004802 A1 | 1/2003 | Callegari | 705/14 |
| 2003/0088461 A1 | 5/2003 | Christensen | 705/14 |
| 2003/0171984 A1 | 9/2003 | Wodka et al. | 705/14 |
| 2004/0056101 A1 | 3/2004 | Barkan et al. | 235/472.03 |
| 2004/0249712 A1 | 12/2004 | Brown et al. | 705/14 |
| 2005/0075932 A1 | 4/2005 | Mankoff | 705/14 |
| 2005/0209921 A1 | 9/2005 | Roberts et al. | 705/14 |
| 2005/0216337 A1 | 9/2005 | Roberts et al. | 705/14 |
| 2005/0222905 A1 | 10/2005 | Wills | 705/14 |
| 2005/0222910 A1 | 10/2005 | Wills | 705/22 |
| 2005/0228719 A1 | 10/2005 | Roberts et al. | 705/14 |
| 2006/0059044 A1 | 3/2006 | Chan et al. | 705/14 |
| 2006/0089878 A1 | 4/2006 | Roberts et al. | 705/14 |
| 2006/0116924 A1 | 6/2006 | Angles et al. | 705/14 |
| 2007/0118426 A1* | 5/2007 | Barnes, Jr. | 705/14 |
| 2007/0174259 A1 | 7/2007 | Amjadi | 707/3 |
| 2007/0204025 A1 | 8/2007 | Cox et al. | 709/223 |
| 2008/0140509 A1 | 6/2008 | Amjadi | 705/10 |

* cited by examiner

METHOD AND SYSTEM FOR PRESENTING BANNERS HAVING DIRECT LINK TO USER PROFILE INFORMATION

CROSS REFERENCE TO RELATED APPLICATIONS

This application claims priority to U.S. Provisional Patent Application Ser. No. 60/501,855, filed Sep. 11, 2003, and is related to the following applications: "Method and System for Generating Intelligent Electronic Banners Based on User Information", U.S. patent application Ser. No. 10/937,305, filed Sep. 10, 2004; "Proximity-Based Method and System for Generating Customized Incentives", U.S. patent application Ser. No. 10/937,355, filed Sep. 10, 2004; "Method and System for Electronic Distribution of Incentives Having Real-Time Consumer-Based Directions", U.S. Patent Application Serial No. 20/937,504, filed Sep. 10, 2004; "Method and System for Electronic Delivery of Incentive Information Based on User Proximity", U.S. patent application Ser. No. 10/937,503, filed Sep. 10, 2004; "Method and System for Managing Inventory and Promotions Campaign Based on Redemption Data", U.S. patent application Ser. No. 10/937,505, filed Sep. 10, 2004; and "Method and System for Generating Real-Time Directions Associated with Product Promotions", U.S. patent application Ser. No. 10/937,312, filed Sep. 10, 2004.

FIELD OF THE INVENTION

The present invention relates to the electronic distribution of secure money saving or discount coupons and other marketing incentives, that includes the ability to electronically deliver personalized promotion information, such as a banner ad, to a user based on the user's location, profile information, proximity preferences and other information where the personalized promotion information has a direct link to the user's profile information.

BACKGROUND OF THE INVENTION

Millions of consumers regularly use product redemption coupons and realize substantial savings as a result. Significant time is spent clipping and sorting coupons, discarding expired coupons and organizing current coupons for use on shopping trips. Conventional coupon distribution results in significant wasted time due to consumers' attempts to manage their coupon use.

Coupons are delivered to consumers through a variety of media such as, for example, free standing inserts (FSIs), in-store shelf coupon dispensers, check-out coupons (generally issued based on the customer's current purchase), register receipt coupons, in-product coupons, instant peel-off on-product coupons, direct mail coupons, and/or other delivery methods. In addition to manufacturers' coupons, consumers use retail store coupons, such as those issued by large retail chains on a weekly basis.

Some consumers use coupons on a fairly random basis. These consumers tend not to keep coupons for future use, but will review coupons available just prior to shopping to see if any of them cover products they plan to buy or if there are any for new or improved products of interest.

More organized coupon users maintain some form of storage system to keep coupons for future use. These consumers often clip coupons regularly from all available sources, and often have coupon filing systems by product category. They will also review their coupons regularly, discarding unused coupons which have expired.

For most consumers, attempts to maintain an organized coupon file often fails. The "bother" and time required to maintained organized coupon files often results in neglect of those files, even though diligent shoppers know that a consistent significant savings is easily achievable using coupons.

The notion of issuing product redemption coupons to consumers was an innovative idea to entice consumers to try new products in the hope that, after the first try of a new product at a coupon discounted price, they would become repeat customers at the regular price. Coupons are effective tools used in launching new products. Manufacturers also find coupons can shore up flagging sales, help reduce excess inventory or win back consumers' brand loyalty, and so coupons for existing products have become customary, so much so that today's consumers have come to expect coupons. Often, coupon price incentives significantly reduce brand loyalty, and manufacturers must issue more coupons than desired to maintain market share. Market share also has been impacted by an increase in the number and variety of competing "no-name" store brands. The competitive nature of the retail industry does not allow manufacturers to reduce coupon distribution, and in some market sectors, such as cereals, the majority of purchases are made with coupons.

Attempts have been made to meet the needs of the coupon industry and the consumer. For example, attempts have included television-based coupon reception system wherein coupon information is transmitted along with program information to a broadcast audience, electronic paperless coupon system where coupon signs are placed near the related item and the discount is automatically applied at the point of sale, kiosk type printer stations located at a retail store linked to the manufacturer(s) in order to obtain specific coupon information, and/or other attempts. While these aforementioned attempts at providing couponing systems are useful in their own right, they fail to provide for a secure and interactive coupon generation system in which the user can request, select, store, manipulate and print coupons as desired, in which user-specific information such as demographic data and data representative of those coupons so requested, selected, printed and actually used may be provided back to the coupon issuer and distributor for more efficient coupon targeting in subsequent coupon issuance and distribution.

It is therefore an object of the present invention to provide such a coupon distribution system which overcomes the aforementioned problems and shortcomings of the prior art.

It is an object of the present invention to provide an electronic coupon distribution system which can be easily accessed by masses of consumers by using a readily available personal computer rather than needing to purchase special-purpose equipment.

It is a further object of the present invention to provide such an electronic coupon distribution system which allows a user to request transmission of coupon data and select, store, manipulate and print coupons from such coupon data.

It is a further object of the present invention to provide such an electronic coupon distribution system which allows the coupon issuing companies to access valuable information directly from the consumer without requiring specific and additional action by the consumer but rather by using the information from the user's personal computer regarding the consumer's selection, printing and actual redemption of coupons, as well as responses to demographic queries posed to the users.

It is a further object of the present invention to provide such an electronic coupon distribution system which allows a consumer to generate shopping lists associated with coupons selected and printed, in order to simplify the shopping process and promote the use of product coupons.

It is a further object of the present invention to provide such an electronic coupon distribution system which allows for automatic deletion of expired coupons in the user's computer database and the modification of redemption amounts of coupons in the user's database, both of which can be transparent to the user.

It is a still further object of the present invention to provide a secure coupon system which generates unique coupons with user-identifying data and allows the printing of a coupon only once, thus eliminating the possibility of fraud by both the consumer and the retailer.

It is a still further object of the invention to provide an efficient, low cost, zip-code/lifestyle/lifestage or household targeted coupon distribution system to tailor the incentives to each user.

It is a still further object of the invention to provide electronic delivery of incentive information, which may include a banner ad, based on a user's location information, profile information, proximity to a particular incentive redemption facility, and other information.

It is a still further object of the invention to enable a user to enter profile information, location information, and proximity preferences so that the user may view advertisements for products or services that are of particular interest to the user and conveniently located for redemption.

It is a still further object of the invention to enable a product or service provider or other entity to target advertisements, such as banner ads, to individuals located within a defined range of an associated redemption facility.

It is a still further object of the invention to provide a direct link to user profile information when presenting personalized incentive information to the user.

SUMMARY OF THE INVENTION

In accordance with these and other objects, provided is a system for distributing and generating at a remote site product redemption coupons comprising a centrally located repository of electronically stored product redemption coupon data, transmission means operatively associated with said centrally located repository for providing data communication between said repository and a plurality of remote user computers, and a remote user computer operatively associated with said transmission means. The remote user computer in the present invention comprises interface means for providing user interaction with the centrally located repository, a memory, and a coupon data management program. The coupon data management program is implemented by the computer for requesting coupon data from the centrally located repository, for storing in the memory coupon data transmitted from the centrally located repository, and for generating printable coupon data from the stored coupon data. The remote user computer also comprises a coupon output buffer operatively associated with the data management program for storing the printable coupon data generated by said coupon data management program.

The present invention additionally comprises a printer for printing product redemption coupons from the printable coupon data stored in the coupon output buffer. Alternatively, the system may enable the user to transmit electronically the printable coupon data from the coupon output buffer to the centrally located repository or directly to the retailer for electronic coupon redemption.

As a result of the present invention, a user of the remote computer is able to request coupon data to be transmitted from said centrally located repository, and the user is able to instruct his computer to print or electronically transfer product redemption coupons generated from the transmitted coupon data. In particular, the user's computer assembles product redemption coupons for printing by using two data components; (1) fixed coupon data which is transmitted to the user's computer during an initialization or "sign-up" process and which remains stored on the user's computer for subsequent coupon generation, and (2) variable coupon data which is transmitted to the user's computer whenever he requests coupon data from the central repository.

Additionally, the coupon data management program of the present invention operates in conjunction with the remote computer to allow the user to select and store certain desired coupon data from the coupon data transmitted by the centrally located repository and print coupons as selected. The coupon data management program also allows the user to generate a shopping list which is correlated to the coupons printed for subsequent redemption.

In the present invention, the data exchange capabilities provided by the transmission medium between the remote computer and the central repository allow the automatic transfer of valuable information from the remote computer to the central repository and, ultimately, to the coupon distributing and issuing centers. Information related to the coupons selected and printed can be supplied to the coupon distributors and issuers, which can also use information obtained from the various retail stores as to which coupons were actually redeemed in order to more intelligently market subsequent coupons and target coupon issuance in a more cost effective manner.

The data exchange capabilities are further advantageously utilized in the present invention to allow, via the central repository, the updating of coupon data stored in the user's remote computer without required interaction from the user if the user is online. In particular, the central repository can delete expired coupons from the remote computer's coupon database and can vary the amount of redemption value of a non-expired coupon if so desired. The capability for the updating and deleting of coupons within a user's computer is programmed in the user's computer such that no further interaction with the central repository is required for such coupons to be deleted or updated.

The present invention provides for secure coupon generation by allowing the printing of a particular coupon only once. Further, and quite importantly, the present invention provides for the printing on each coupon of certain user-specific data, thus making each coupon printed unique. Thus, two different users with access to printing a particular coupon will each print coupons with the same product, discount, and expiration date data, yet each will be unique since printed thereon will be user-specific data, preferably in the form of a user-specific bar code. Thus, any attempts to duplicate via photocopying techniques any particular coupon will be discouraged since the coupon redemption center will detect when a particular coupon has been redeemed, will identify the user who redeems a particular coupon, and will disallow any attempt at redemption of a second coupon with identical product and user-specific data.

The present invention provides for a method and system for generating incentive information, such as electronic banners, based on user profile, location and other information. A user may specify profile information including specific areas of interest. This enables the promotion service to provide incentive information that may be of particular interest to the user. This effectively eliminates the bombardment of so-called junk mail. Instead, the user may receive information regarding incentives for products and services that the user will most likely be interested in.

In addition, the present invention provides incentive information, such as a banner ad, with a direct link to user profile information. This enables users to quickly and easily update and modify profile information so that users may customize the type and amount of incentive information to be received.

The present invention further enables a user to provide location information and proximity preferences. The user may identify the range of distance the user is willing to travel to redeem incentives. This provides the user with advertisements of products and services that are most conveniently located for redemption.

The present invention further enables merchants, service or product providers, and other entities the ability to specify a target proximity range for advertisements. The promotion service may use user location information to provide targeted advertisements to users within a predetermined proximity to the user's identified location. This provides convenience to the user when attempting to redeem targeted coupons. Thus, a product provider may limit its exposure to within a predetermined mile radius of a store (e.g., redemption facility). This conserves resources while maximizing exposure to interested potential customers. Potential consumers who receive advertisements and incentives that may be redeemed at a conveniently located redemption facility may be more inclined to take advantage of the promotion.

DETAILED DESCRIPTION OF PREFERRED EMBODIMENTS

Figure 1:
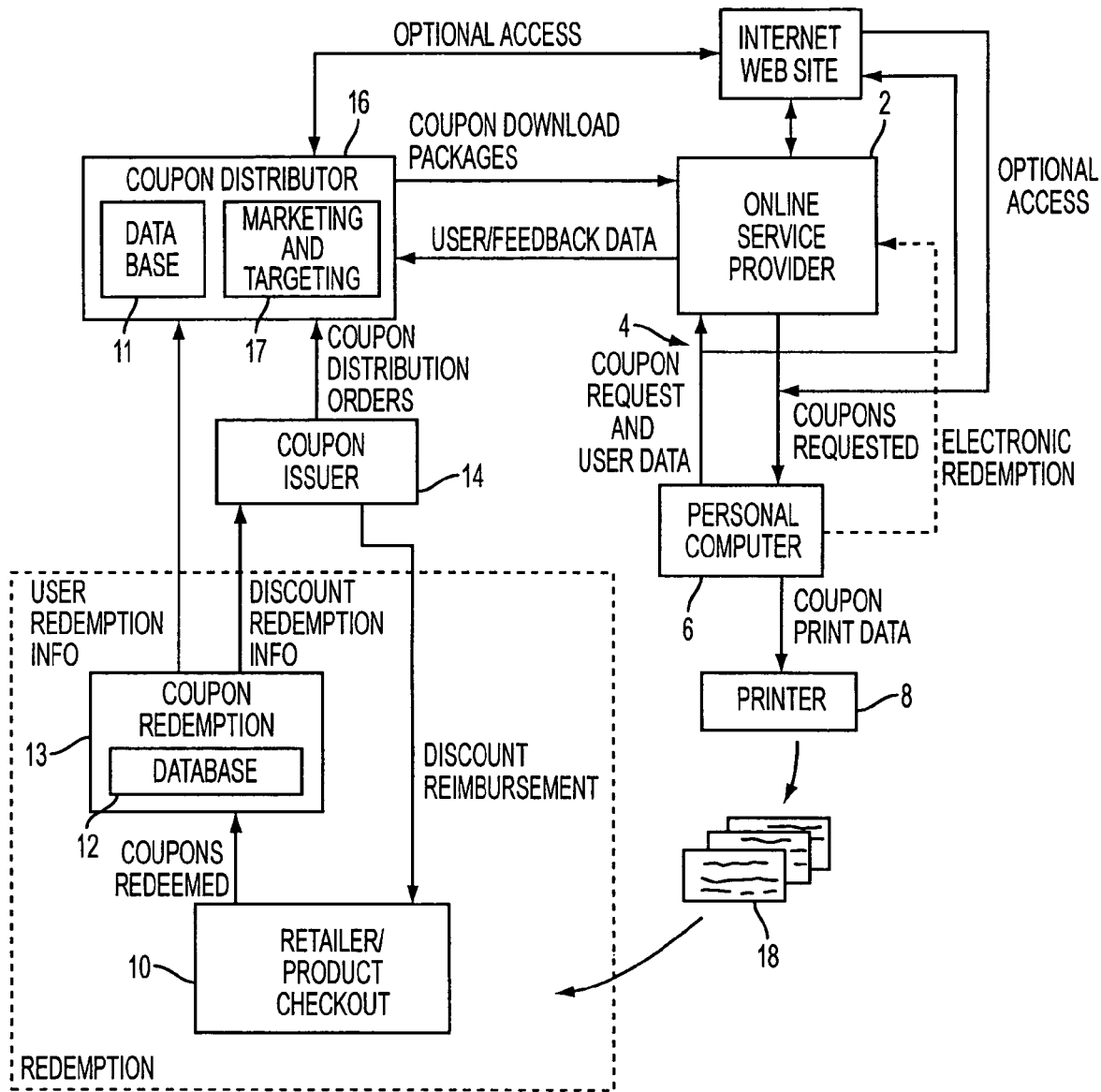
FIG. 1 is a block diagram schematic of the system of the preferred embodiment for the electronic distribution of coupons.
Figure 8:
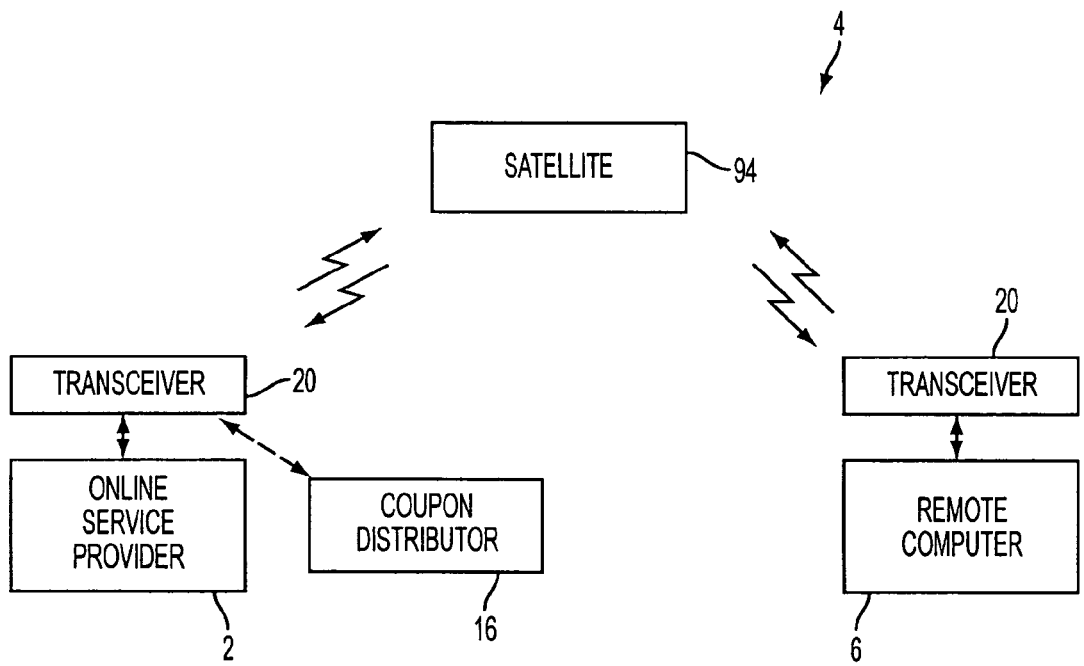
FIG. 8 is a block diagram of an alternative embodiment of the present invention in which data is transmitted between the central repository and personal computer by satellite.
Figure 9:
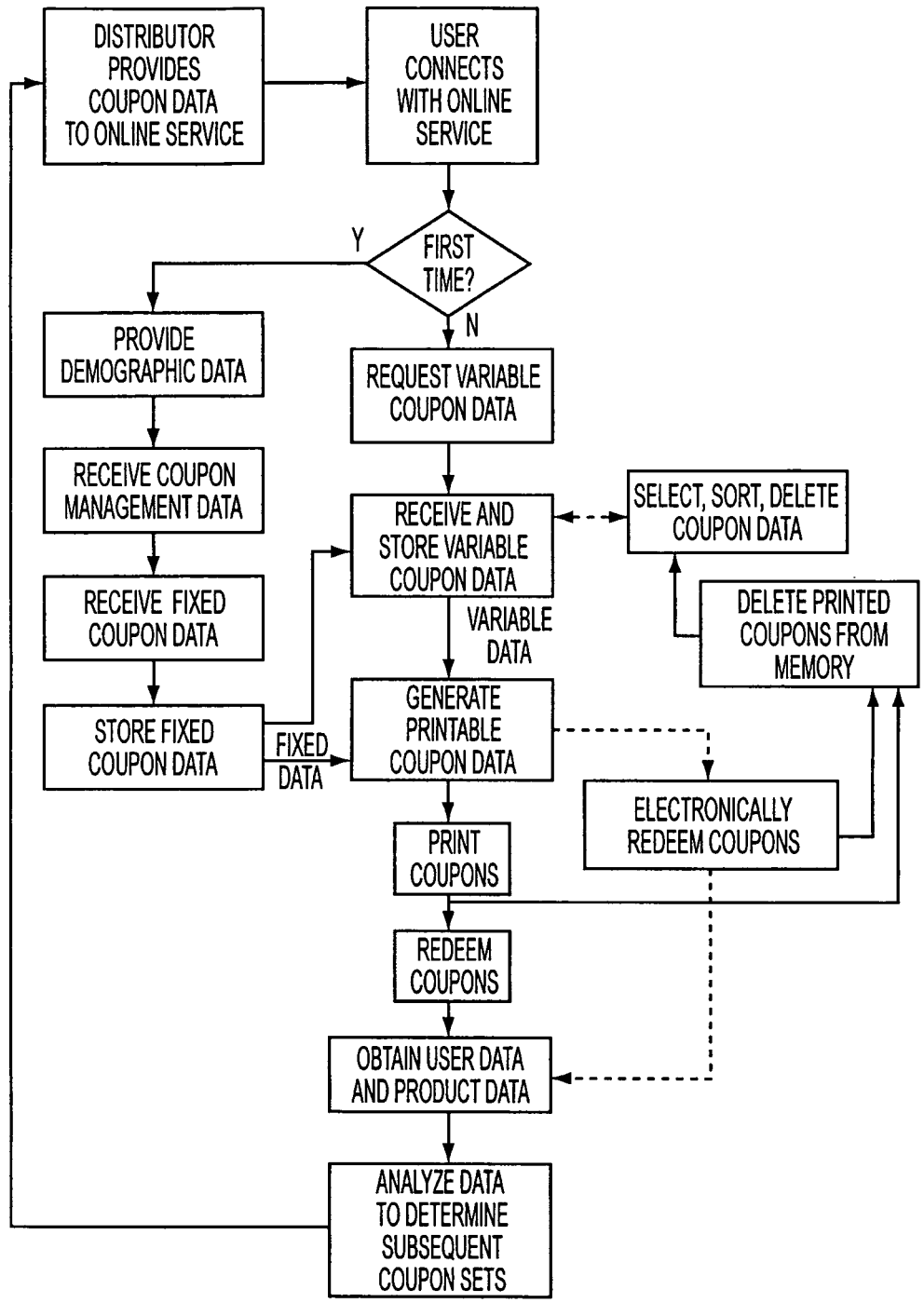
FIG. 9 is a flowchart of the operation of the present invention.

Referring to the system block diagram of FIG. 1 and the flowchart of FIG. 9, the electronic coupon distribution system of the preferred embodiment comprises a central located repository of electronically stored coupon data, which in the preferred embodiment is an online service provider 2. The term online service provider refers herein to any computer-based information service provider which is accessible by a remote personal computer user via a communications data link such as the public switched telephone network (PSTN) or the like, such as PRODIGY, COMPUSERVE, or AMERICA ONLINE. In addition, it is contemplated that the electronic coupon data distribution may be carried out by connection to any readily accessible Internet site such as the World Wide Web. Referring to FIG. 8, it is further contemplated that electronic coupon distribution may also be carried out via digital satellite communication links, thus avoiding the need for hardwired (i.e., PSTN) connectivity between the repository and the remote user computer. Thus, any centrally located computer system which is accessible to the public by any transmission means is contemplated as being within the scope of this invention. As used herein, the term "user" denotes an individual user or a household of users linked through one account.

The online service provider has stored in its database 40 (see FIGS. 6 and 10) various packages of electronic coupon data, the content of which will be further described below. The electronic coupon data is provided, by a coupon distributor 16 or coupon issuer 14, by any various means such as electronic transmission via the PSTN or satellite data exchange. The online service provider also stores in a demographic data file 42 user-specific data, including coupons selected data, coupons deleted data, coupons printed data and user demographics, as will be described below, for subsequent transmission to a coupon distributor 16. The coupon distributor 16 will utilize the user-specific data and coupon redemption data in compiling subsequent coupon packages targeted specifically at certain user categories.

Figure 2:
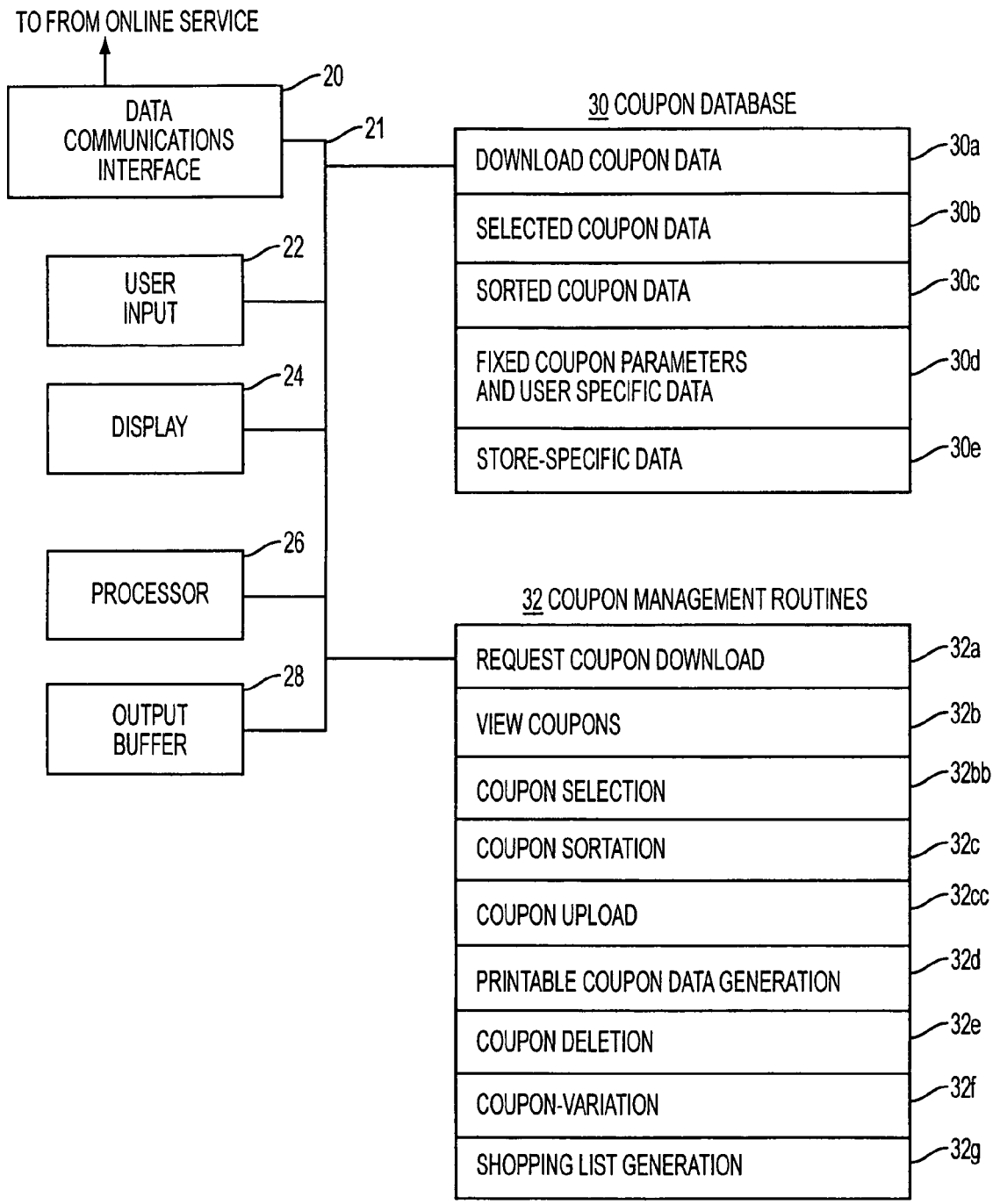
FIG. 2 is a detailed block diagram of the remote personal computer of FIG. 1 configured in accordance with the present invention.

The online service provider 2 is connected with the data link 4 and is thus accessible by any remote personal computer 6 having a data communications interface 20 such as a modem (see FIG. 2). The online service provider communicates with the personal computer 6 in order to transmit requested coupon data, and also in order to receive coupon requests and the user-specific data mentioned above.

The remote personal computer 6 has connected thereto a printer 8, which may be any type of computer printer capable of printing graphics. The printer 8 is instructed by the coupon data management routines 32 stored in the computer 6 in order to print printed coupons 18, as will be described in detail below.

The printed coupons 18 are used in the normal fashion by a consumer when shopping at a desired retail store 10. That is, the coupons 18 are presented to a product checkout station 11 along with the associated products for purchase, and the discount amount shown on the coupon 18 is credited to the consumer at the point of sale. The redeemed coupons 18 are transmitted to a coupon redemption center 13 where they are electronically read, and user-specific data is stored in a coupon redemption database 12.

Figure 5:
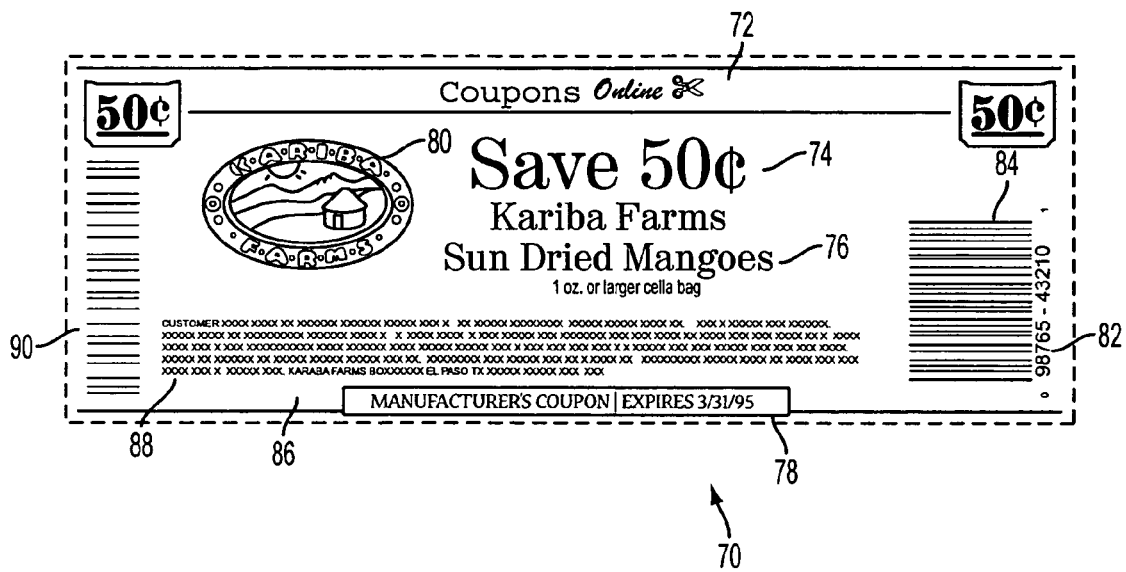
FIG. 5 is a diagram of a printed coupon resulting from the electronic distribution in accordance with the present invention.

In addition to the usual coupon information found in prior art coupons (e.g., redemption amount, company and product name, expiration date, etc.), the coupons 18 of the preferred embodiment of the present invention contain user-specific data in the form of a unique user bar code 90, as shown graphically in FIG. 5. The user bar code 90 is encoded with user-specific information such as the user name and/or other unique identification criteria such as a social security number or online service address. This information renders each printed coupon 18 unique, since an otherwise similar coupon presented by a different consumer will comprise a different user bar code 90. The use of a unique coupon 18 is but one aspect of the secure nature of the present invention as will be described in detail below.

The coupon redemption center 13 receives from a number of stores 10 the coupons redeemed, verifies the value of the redeemed coupons, determines the identification of users who redeemed the coupons, and distributes the information read from the coupons 18 to the individual coupon issuer 14 and to the coupon distributor 16. In particular, information regarding the redemption amount and the redeeming store 10 is forwarded to the particular coupon issuer 14 named on the coupon 18, which then credits the redeeming store 10 with the total amount of discounts given. Of particular value in the present invention is the distribution of user-specific data to the coupon distribution center 16, which collates such user information and performs marketing analysis via a marketing analysis means 17 in order to compile subsequent coupon packages targeted specifically at certain user categories. The coupon distribution center 16 utilizes the user-specific redemption data along with user-specific demographic data supplied by the online service provider 2 in order to compile subsequent coupon data download packages for use by consumers once again.

Figures 4A, 4B:
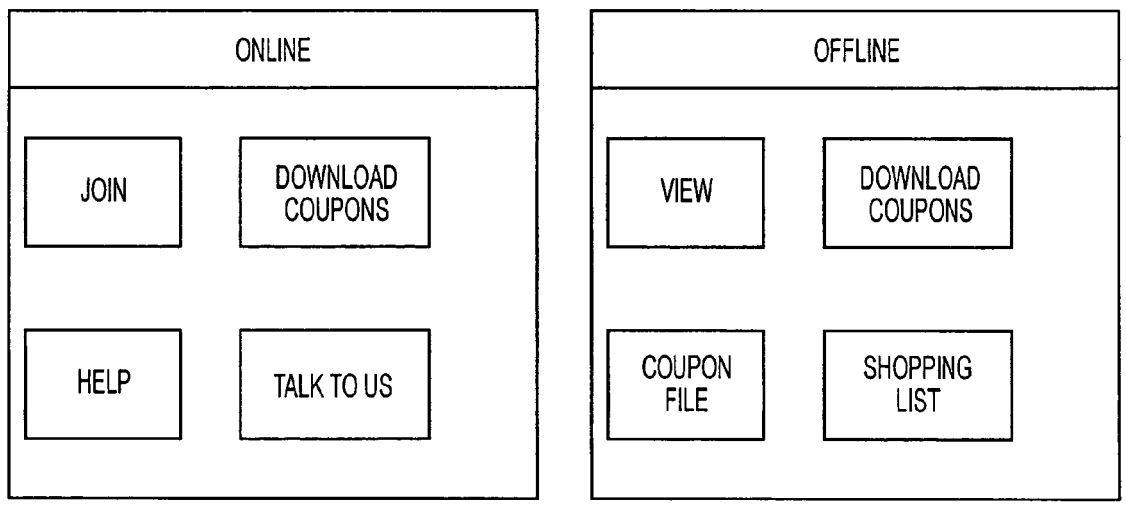
FIGS. 4*a* and 4*b* is a pictorial representations of the online and offline display screens, respectively, which are exhibited to a user in the present invention.

An online display screen 60 is shown in FIG. 4a, which is provided to a user on a display 24 of his remote computer 6 whenever he is in online communication with the service provider 2. The online display screen 60 comprises a join service function button 62, a download coupons function button 64, a help function button 66, and an online communications button 68. When the user desires to initially register for the electronic coupon distribution service, he selects the join service function button 62 which initiates a dialog with the online service provider 2 in order to request certain demographic data from the user which will be used to target specific coupon data packages for subsequent downloading. The user has the option of providing the requested information if he so desires. In addition, an offline coupon management program is transmitted electronically to the user's computer 6 for subsequent coupon data requesting, downloading and processing.

Figure 6:
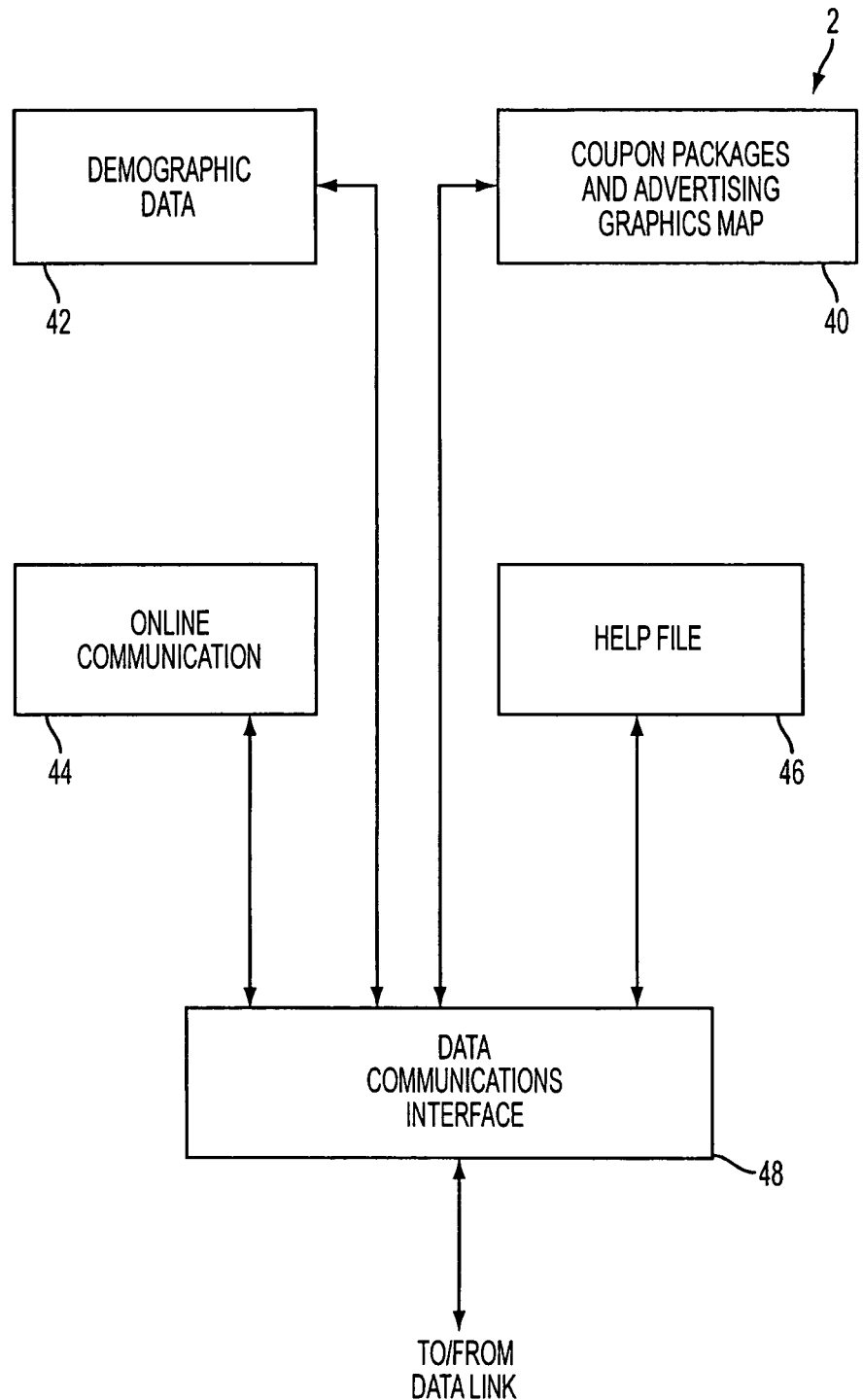
FIG. 6 is a schematic block diagram illustrating the main functional areas serviced by the online service provider of the preferred embodiment system.

FIG. 6 illustrates the functional aspects of the online service provider 2 in the preferred embodiment of the present invention. The main features provided by the online service provider 2 are the coupon packages file 40, the demographic data file 42, the online communications server 44, and the help file 46. Each of the aforementioned features communicates with the user via the data communications interface 48.

The coupon packages file 40 comprises electronic coupon data and other types of advertising materials supplied by the various coupon issuers 14 through the coupon distributor 16. Individual users' coupon data packages are drawn from this file based on demographic data and historic buying profiles stored in the demographic data file 42. Advertisements may consist of graphics, text, recipes, competitions or other inducements or a combination thereof.

After joining the electronic coupon service, the user can order a package of electronic coupons from the online service provider 2 by selecting the download coupon function button 64. When this button is selected, commands are generated and transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30a in the coupon database 30.

The demographic data file 42 contains data representative of demographic inquiries presented to a user at the time that the user requests a download of coupon data from the coupon package data file 40, as well as data representative of the users' responses thereto.

The online communication server 44 is accessed by the user selecting the online communication button 68. The online communication server is a bulletin board type file where users can post messages to a coupon distributor or issuer regarding any issue of interest. The message data is transferred to the appropriate destination by the online service provider 2, which also collects the responses thereto and posts them on the online communication server 44, thus allowing the user to fetch the response when logged on at a subsequent time.

By selecting the help function button 66, the help file 46 is used as a means for providing standard help and other useful information to a user.

Referring to FIG. 2, the remote personal computer 6 of the preferred embodiment comprises a data communications interface 20 (such as a modem) for connecting the computer to the data link 4 (such as a PSTN), a user input device 22 such as a keyboard and mouse or other type pointing device, a display 24, and a processor 26, all of which are common to personal computers and are well known in the art. The computer 6 also comprises an output buffer 28, which typically resides in random access memory. The computer 6 is configured to operate in accordance with the present invention via a coupon database file 30 and an offline coupon data management routine file 32 loaded onto a fixed memory such as a hard disk drive. All of these internal components and files are connected to a data bus 21 for communication therebetween in accordance with techniques well known in the art.

The coupon database file 30 is segmented into various sections as shown in the memory map of FIG. 2. The coupon database of the preferred embodiment comprises downloaded coupon data 30a, which is the entire coupon data package downloaded from the online service provider 2; selected coupon data 30b, which is a subset of the downloaded data and represents specific coupons electronically "clipped" and stored therein; sorted coupon data 30c, which is selected coupon data sorted in accordance with a particular set of criteria (e.g., all fruits together, then all dairy products, etc.); fixed coupon parameters and user-specific data 30d, which is certain unvarying data used in printing the coupons as will be described in detail below; and store-specific data 30e, which is information regarding the product arrangement in a certain retail store 10 which will allow the user to prepare a shopping list tailored to the particular store.

The offline coupon data management routines 32 are executed by the processor 26 in conjunction with the coupon database 30 in order to request, obtain, store, select, sort, and print coupons as desired. The offline coupon data management routines 32 are executed by selecting a desired function button 52, 54, 56, or 58 as shown in the offline display screen 50 in FIG. 4b. The offline display screen 50 is shown on the display 24 when the user runs the coupon data management program on his or her personal computer 6. The offline coupon data management routines 32 are executed in an offline fashion; that is, the user does not need to first be in online communication with the service provider 2. If a particular function button 52, 54, 56, or 58 chosen by the user initiates a routine 32 which requires online communication, that routine will initiate, control and terminate an online session with the service provider 2 automatically.

The request coupon download routine 32a is executed when the user desires to order a package of electronic coupons from the online service provider 2. This routine is called when the user selects the download coupon function button 54. When this routine is called, commands generated by this routine are transmitted via the data communications interface 20, through the data link 4, and up to the coupon package file 40 resident at the online service provider 2. The requested coupon data package and associated advertising materials are transmitted by the online service provider 2 to the personal computer 6, where it is stored in the downloaded coupon data file 30a in the coupon database 30.

Prior to downloading the requested coupon data package to the computer 6, the demographic data file 42 provides certain demographic queries to the user in order to obtain valuable information for use in marketing analysis and subsequent coupon package generation. The users' responses to the queries are transmitted to the online service provider 2 and stored in the demographic data file 42 for subsequent processing.

The user may select the view function button 52 in order to view the coupons and advertisements previously downloaded. This selection will call the view coupons routine 32b, which will access the downloaded coupon data file 30a and present it to the user via the display 24.

While viewing the coupons and advertisement, the user may select a desired coupon for further sorting, storage, printing or deleting and/or shopping list generation by selecting or "clipping" the coupon with the mouse or keyboard input 22. Coupons are clipped by scrolling through related advertisements. In order to avoid the need for clipping, the user may print or delete a desired coupon. The coupons selected in this function are stored for further processing in the selected coupon data file 30b.

The coupon file function button 56 enables the user to perform several operations on his selected coupon data file 30b. The user may view the coupons selected (from the selected coupon data file 30b), and may choose any of them for printing. Further, a sortation option is provided which logically sorts, by category and subcategory, the coupons stored. Thus, the management program automatically places all the dairy coupons together, and may also place all the milk coupons together within the dairy category. This is carried out by the coupon sortation routine 32c, and is akin to the manual filing system used in the prior art and will aid the user in viewing his selected but unprinted coupons in an efficient manner. The sorted coupons may be loaded into the sorted coupon data file 30c for subsequent viewing and printing. The user may optionally sort the coupons manually by his own classification.

The shopping list function button 58 calls the shopping list generation routine 32g when selected by the user. This routine will allow the user to generate a list from a menu presented on the screen whichever items the user desires to purchase, and the user can store and/or print this list as desired. The items on the list are compared against coupon data stored in the coupon database 30 and the user is informed of their existence. The user may then print out those coupons along with the shopping list. Alternatively, the user may select certain coupons for printing, and the item associated therewith is automatically placed on the shopping list. Thus, in either fashion, the user's shopping list generation and coupon "clipping" tasks are conveniently merged in a timesaving manner.

The shopping list generation routine 32g may also advantageously use data stored in the store-specific data file 30e in order to prepare a shopping list tailored to an individual retail store. Thus, data regarding the layout of the store, the food items available at the store, and the like, are used by the list generation routine 32g in order to organize the purchase items accordingly. The data stored in the store-specific data file 30e may be obtained by any of several methods; by downloading from the online service provider 2, by inputting via a floppy disk memory supplied by the store, or even manually input by the user. Data for different stores can be kept in the file 30e and the user simply selects the store he intends on using at that particular time. The user may select a standard pre-programmed shopping list, his last generated shopping list, or a blank shopping list from which to commence his shopping list preparation.

The coupon upload routine 32cc is called automatically and without user request whenever user requests a coupon download package from the online service provider 2. A record is kept by the upload routine 32cc indicative of each coupon selected by the user and each coupon printed by the user. This record is sent to the demographic data file 42 in the online service provider 2, and is used for marketing analysis along with data regarding which coupons were actually redeemed, which information is obtained from the manufacturers' redemption agency or center.

Coupons are printed by the printable coupon data generation routine 32d, which is invoked by a user when he selects a print command from the coupon file function 56. This routine obtains data from two sources in the coupon database 30: the fixed coupon parameters and user-specific data file 30d, and the variable coupon data associated with the particular coupon selected for printing.

Figure 3:
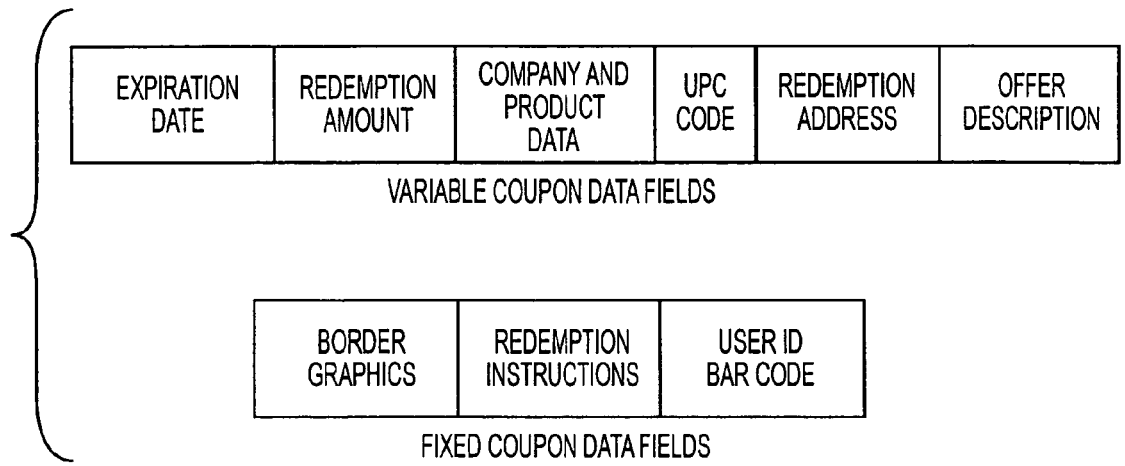
FIG. 3 illustrates exemplary data field formats of the electronic coupon data as implemented in the present invention.

Referring to FIG. 3, the data format of the fixed coupon parameters and user-specific data are set forth and include predefined border graphics which are the same for every coupon printed, redemption instructions, and a user identification bar code number. The user identification bar code number is a unique number assigned to that user, e.g. his social security number or online identification number. This number will be encoded by the printable coupon data generation routine 32d and printed as a bar code 90 on each coupon 18 printed for the particular user. This information will thus be obtained by the coupon redemption center and provided to the coupon distributor 16 for demographic analysis and the like.

The unique user bar code 90 also renders the electronic coupon system of the present invention secure and virtually fraud-proof. Although a user is able to print out a particular coupon 18 only once (to be described in detail below), the coupon issuer 14 could still be defrauded by a user or retailer who might photocopy a printed coupon numerous times and fraudulently and repeatedly present it for redemption. However, in accordance with the present invention, each coupon printed by a user is unique, and the scanning of a coupon presented for redemption will be stored at the coupon redemption center. Thus, the coupon issuer will know if a particular user has redeemed a particular coupon and thus disallow further redemption of a photocopied coupon bearing the same indicia.

Referring again to FIG. 3, the data format of the variable coupon parameters are set forth and include the coupon expiration date, the redemption amount, the company and product information, the UPC code, the redemption address, and the description of the coupon offer.

Thus, the printable coupon data generation routine 32d combines all this information and generates a record indicative of the unique coupon to be printed. This record is temporarily stored in the output buffer 28, where it is subsequently sent to the printer 8 for printing. In the alternative, the coupon may be redeemed electronically by sending the coupon data in the output buffer via the data communications interface 20 back to the online service provider 2. This is especially useful in the "electronic shopping mall" environment now found in many online services. The electronic coupon data could also be routed via the data communications interface 20 to a retail store where the user will be shopping, where the coupon data is held in a buffer pending purchase by the user of the matching product.

As described above, the electronic coupon distribution system of the present invention allows the printing of a particular coupon only once, thus providing for security and guarding against fraudulent redemption. This is accomplished by the coupon deletion routine 32e, which is called whenever a coupon is printed and deletes the coupon from the database 30 or renders it unprintable by setting an appropriate flag. In addition, the coupon deletion routine 32e allows for automatic deletion of expired coupons by periodically checking the expiration date field of each coupon against a real-time clock found in the computer 6. Optionally, the user may voluntarily delete any coupon which is expired if the real-time clock is not set to the correct date. For the user's convenience, the online service provider 2 can check the system clock of the user's computer 6 during a communications session and, if the date is incorrect, can ask the user if he would like the date adjusted automatically.

Since the actual expiration date is always printed as part of the coupon, the function of deleting expired coupon data from the user's computer 6 is for the convenience of the user rather than for security purposes.

The system of the present invention also allows for time-sensitive deletion of certain coupon data from the user computer 6 which is unrelated to the expiration date. That is, certain coupon data may be automatically deleted from the user's computer after, e.g., one month, notwithstanding that the coupon, if printed, might have an expiration date in six months. This feature is included to prompt users who know of the time-sensitive autodeletion to promptly print (and use) coupons rather than risk having them deleted from their database.

The coupon management program also can vary the redemption value of any coupon already downloaded to the user's computer 6 without the need for specific user interaction. A coupon variation routine 32f is called which aids in this task. Again, any time that a user initiates a download of coupon data, the on-line service provider 2 can update redemption amounts for coupons whose issuers have decided to change the discount amount.

Referring to FIG. 5, the secure coupon 70 generated and printed in the preferred embodiment is illustrated in detail. The secure coupon 70 comprises the following fixed components taken from the fixed coupon parameter and user-specific data file 30d: border graphics 72, redemption instructions 88, and user identification bar code 90. The secure coupon 70 also comprises the following variable components which change for each coupon selected: expiration date 78, redemption amount 74, description of the offer 76, company and/or product information 80, the item's UPC number 82 and the associated UPC bar code 84, and the redemption address 86.

Figure 10:
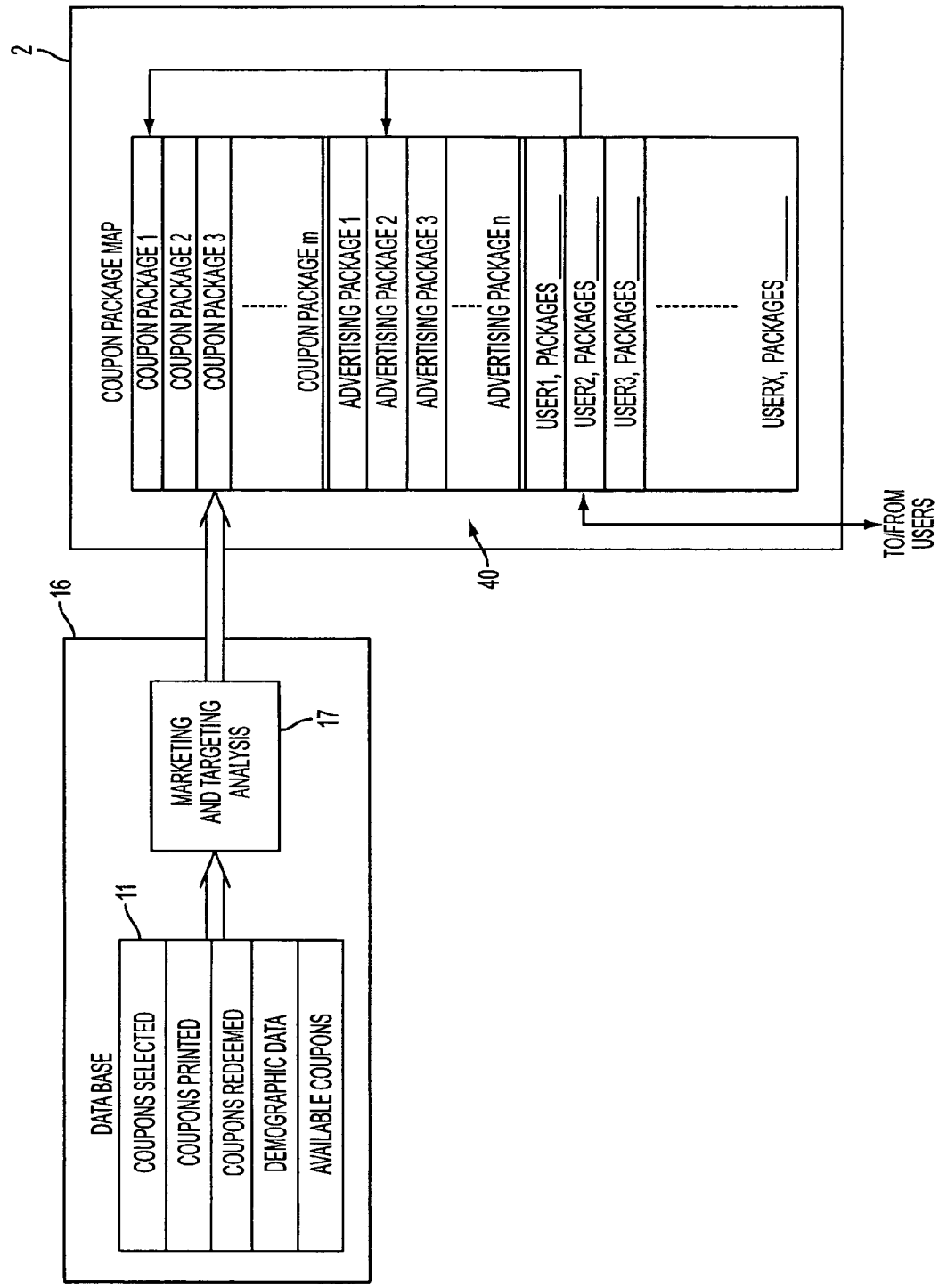
FIG. 10 is a schematic block diagram of the implementation of the coupon data package generation.

Referring to FIG. 10, the generation of coupon data packages by the coupon distributor 16 will be explained. The information collected by the coupon distributor 16 from the online service provider 2 regarding the coupon data selected by the user, the coupon data printed by the user, and the requested demographic information is stored in a database 11. The database 11 also stores information from the coupon redemption center 13 regarding the coupons actually redeemed by the user. The database 11 further stores information regarding all coupons which are made available by the various coupon issuers 14 from which it will generate coupon data packages for subsequent downloading to users.

The information stored in the database 11 is input to the marketing and targeting analysis means 17, which carries out the function of analyzing the aforementioned information in a manner known in the art to arrive at different coupon packages. That is, it may be determined by the analysis means 17 that users with dogs in their household (which is known by the demographic responses) will get a certain package comprising dog food coupons. It may be further determined that users who select, print and redeem dog food coupons of Brand X will get coupons issued by Brand Y, or will get only low value coupons since they are already dog food coupon users, etc. That is, depending on the marketing and targeting criteria and objectives, the analysis means will generate coupon packages as desired.

Thus, the analysis means generates a number of differing coupon data packages for transmittal to the online service provider 2. The analysis means also provides specific mapping information which will instruct the online service provider as to which user should be provided with which package(s). For example, user 1 may be mapped to coupon data packages 2 and 3; user no. 2 to packages 3 and 6, etc. This mapping function may be carried out by the coupon distributor and provided to the online service provider at regular intervals, e.g. once per week. Thus, the coupon selection, printing and redemption habits may be analyzed over a time period and used to determine the subsequent targeted packages.

In addition to mapping certain coupon data packages to certain users, certain advertising packages may be mapped to the users in a similar fashion.

In accordance with the present invention, the marketing analysis, coupon packaging, and coupon package distribution functions carried out by the coupon distributor 16 may be carried out at the central data repository, i.e. Internet web site. Further, the coupon redemption and user redemption information processing functions individually carried out by the coupon redemption center 13 and the individual retail stores 10 may be combined into a single redemption center, as shown by the dotted line in FIG. 1. The physical layout of the functions within the system of the present invention is a matter of practicality and choice of the systems designer and does not impact the utility of the present invention.

Figure 7:
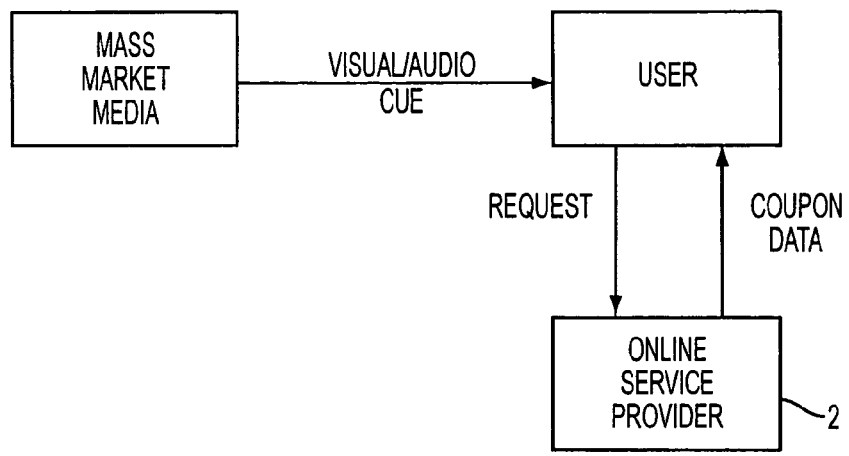
FIG. 7 is a diagram of the use of an external cue to prompt access by the user of the system.

In an alternative embodiment of the present invention, the user is provided with a visual or auditory stimulus or cue to suggest an access of the electronic coupon distribution system. Referring to FIG. 7, a message or logo may be included along with the advertising material normally provided on television, in the newspapers, and the like. This will indicate to a user that he should access the online service provider 2 in order to obtain coupon data related to the advertised product. The availability of the coupon could be time-sensitive, which would provide further incentive to the user to use the system in a prompt and efficient manner. When the radio media is used, a tonal or spoken cue may be included during the advertising message to accomplish the same result.

The amount of redemption discount included with a coupon downloaded to a user may be varied depending on certain demographic information that the system has about the user. For instance, the system may provide a certain value for known users of a brand (which information it will obtain by demographic inquiry or through previous redemptions in the system), and it may provider a higher discount in order to provide an incentive to users of a competitive brand. The ability to vary the value of a discount offer in accordance with such demographic and usage data is a unique advantage offered by the system of the present invention and heretofore unavailable in the prior art.

Referring to FIG. 8, an alternative means of communication between the online service provider 2 or the coupon distributor 16 and the remote computer 6 is illustrated. A satellite communications apparatus 94 is advantageously used to provide a wireless data link 4. In this embodiment, the data communications interface 20 is a satellite antenna dish or other transceiver unit which provides operative communication between the remote computer 6 and the satellite 94. A similar unit is located at the online service provider 2 in order for full wireless data communications to be achieved.

The flowchart of FIG. 9 illustrates the flow of information in the system of the present invention. The information flow illustrated therein has been described in detail in connection with the implementing system.

In a further alternative embodiment of the present invention, the functions of the online service provider 2 are carried out at a site on the Internet. That is, a user may access the coupon data repository by accessing an appropriate Internet site. In this embodiment, the downloaded coupon management routines are encoded with a unique user identification number, which may be for example the user's e-mail Internet address. When the user requests coupon data packages to be transmitted, the user identification number is encrypted and sent to the Internet site along with the request. Appropriate routines are implemented at the Internet site to decrypt the user's identification number and compare it against a list of valid members in order to ensure the validity of the user.

In another alternative embodiment of the present invention, all coupon data management functions are carried out by the online service provider 2 rather than by the offline coupon data management routines 32. In this case, the speed of access of the online service provider 2 must be high, for example on the order of 28.8 kbps. When high speed communications are used, the need for offline data manipulation is eliminated and all processing can be carried out in an efficient manner while connected to the online provider 2.

Figure 11:
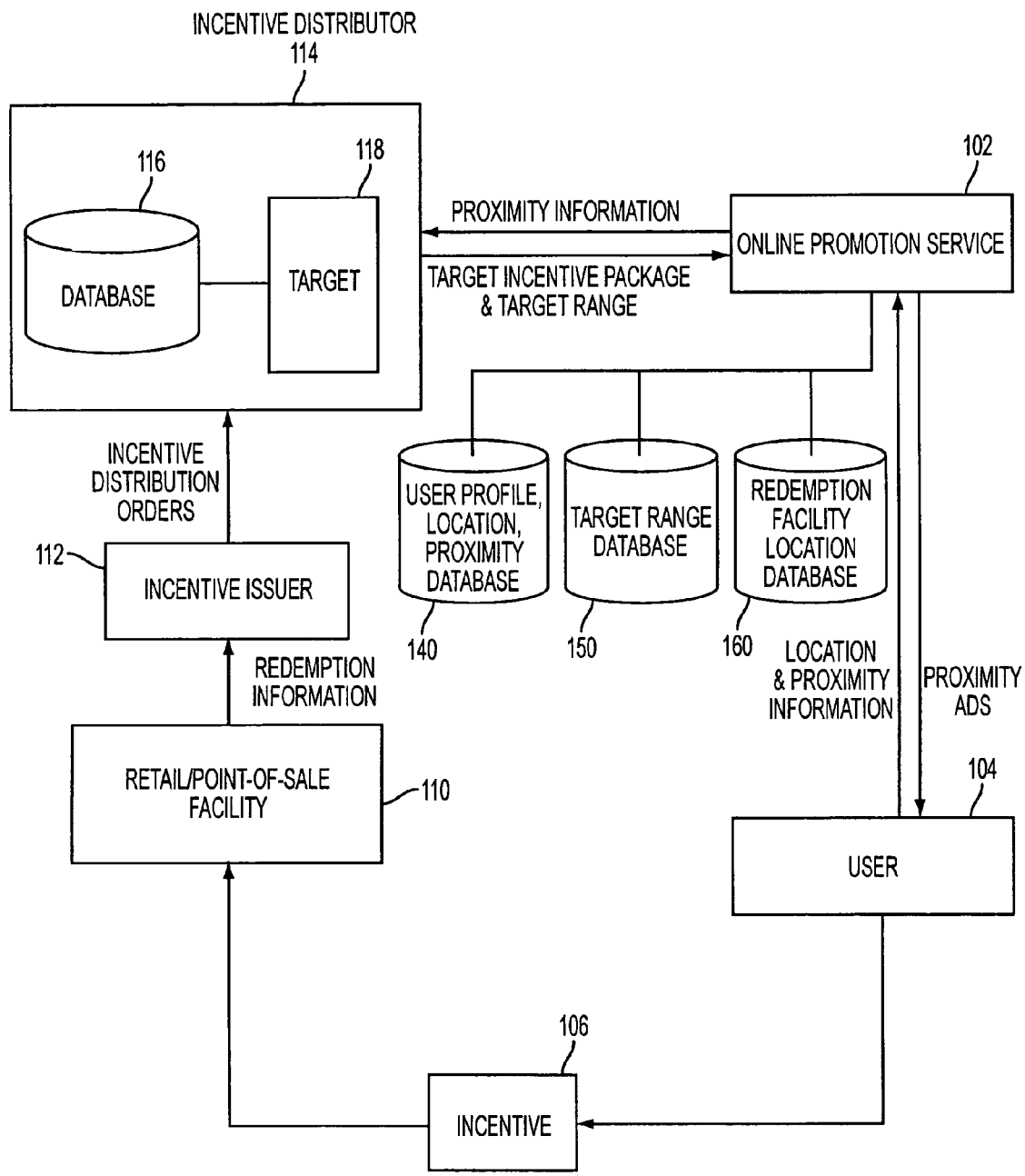
FIG. 11 is a schematic block diagram illustrating a system for providing proximity advertisements according to another embodiment of the present invention.

FIG. 11 illustrates a system for providing proximity advertisements based on user profile, location, proximity preference and other information according to another embodiment of the present invention. Online Promotion Service 102 may provide incentives to User 104 (or a plurality of users). Incentives may include coupons, promotions, rebates, sales notifications, free samples, and other incentives. To promote product (or service) exposure, Online Promotion Service 102 may also provide advertisements for products (or services) and associated incentives on various web pages. These advertisements may be presented to a user at an identified location based on the proximity of the user and an associated redemption facility.

According to an embodiment of the present invention, user location information may be conveyed to an online promotion service through a plug-in (or other location identifying device) on the user's CPU where the online promotion service associates a user with a particular location.

By identifying one or more user locations and user defined proximity preferences, User 104 may receive targeted advertisements that are located within a defined proximity range to the identified user locations. For example, by using the user's zip code, the user may receive targeted advertisements for product or service providers that are located within the same zip code. This makes shopping and redeeming incentives more convenient for users.

Upon obtaining an incentive, User 104 may redeem Incentive 106 at a redemption facility, such as Retail/Point-of-Sale Facility 110, where information related to the redemption process may then be conveyed to Incentive Issuer 112. Incentive Issuer 112 may provide incentive distribution orders along with other incentive information to Incentive Distributor 114. Based on proximity information conveyed by Online Promotion Service 102, Incentive Distributor 114 may provide target incentive packages and distributor defined target ranges to Online Promotion Service 102. In another embodiment, Retail/Point-of-Sale Facility 110, Incentive Issuer 112 and Incentive Distributor 114 may be combined as one entity.

Online Promotion Service 102 may process information related to location and proximity data, such as User Profile, Location and Proximity Database 140, Target Range Database 150, Redemption Facility Location Database 160, and other information. Database 140 may include user profile information, user location information, user specified proximity information and other information. Database 150 may include target ranges specified by product or service providers, incentive distributors, incentive issuers, and other entities. Database 160 may include locations of possible redemption facilities and other redemption facility related information.

In Database 140, user profile information may include categories of interest, details of user interests, frequency of visits to particular facilities and other information. Categories of interest may include restaurants, groceries, products, services, clothing, pets, hobbies, and other interests. Details may include the user's preferences and selections with respect to a particular category. For example, under "pets" category, the user may provide details regarding the type of pets the user owns, how many pets the user currently owns, the type of pet food the user purchases, the preferred pet stores the user shops at, and other related information. The user may also specify the frequency of visits to specified pet stores. In addition, the user may request services or products not available at the specified pet stores.

In Database 140, user location information may include the street address, city, county, state and zip code of the user's home address. Other identifying information may also be provided. The user may specify additional addresses, such as one or more work addresses, and other frequently visited locations, including schools, day care facilities, and relative's home. The user may prioritize the locations according to most frequently visited, most conveniently located or other criteria.

In Database 140, proximity preference information may include a range the user is willing to travel to redeem incentives. For example, the user may specify a proximity range of a specified number of miles the user is willing to travel to redeem incentives. The user may also specify an area, county, city, zip code, shopping center or other identifying markers. For example, the user may identify a proximity range of a five mile radius from the user's home address. In another example, the user may identify a proximity range as being the route traveled between the user's home address and work address. Also, the user may identify a proximity range as a shopping area, such as a local shopping mall and associated shopping plazas within a 3 mile radius. In another example, the user may select a reference point address, such as a well traveled intersection, as the point of reference in determining proximity ranges.

In addition, an Incentive Distributor, Incentive Issuer, product or service provider, or other entity may specify proximity information, such as a target range of advertisement exposure. Location and proximity information specific to a particular entity, such as Incentive Distributor 114, may be stored in Database 116. In this example, Incentive Distributor 114 may selectively target locations and areas within a defined range, through Target module 118. An incentive distributor, or other service or product provider, may convey target proximity information to Online Promotion Service 102 where this information may be stored in Target Location Database 150. This aspect of the invention enables a product or service provider to target advertisements to potential consumers within a specified distance from one or more redemption facilities associated with the product or service provider. For example, a local florist may target advertisements (e.g., an electronic banner ad) to consumers within a five mile radius of the florist's place of business. In another example, a national toy store may want to target consumers within specified cities in California and Nevada where sales are lower than cities in New York and Washington, D.C. Information related to the location of possible redemption facilities may be stored in Redemption Facility Location Database 160. Product or service providers may selectively advertise to a specific area based on user profile information and user preferences. Also, sales data and marketing strategies may also be used to drive advertisement exposure.

Figure 12:
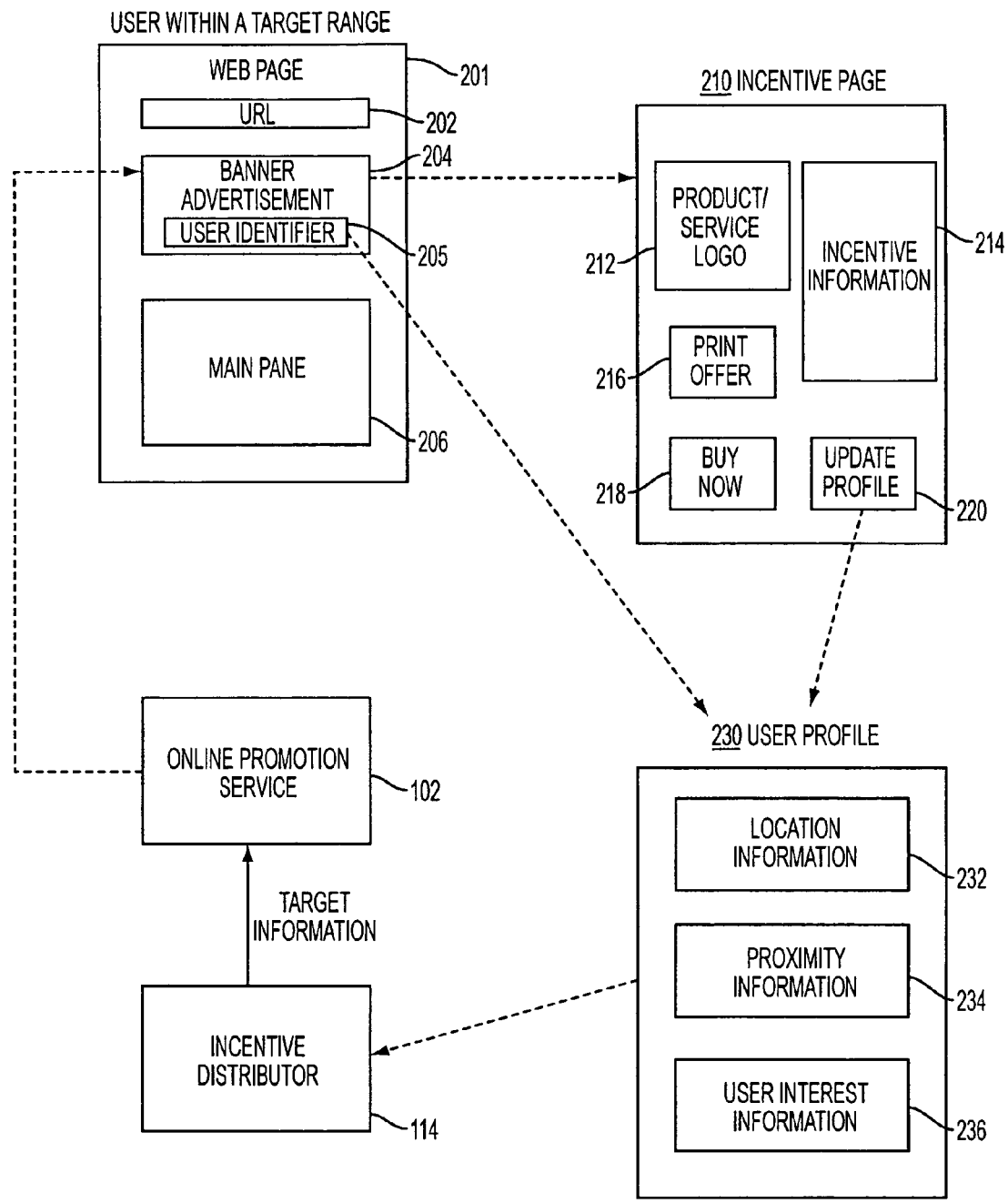
FIG. 12 is an illustration of a process for presenting proximity advertisements where the advertisements include a direct link to user profile information according to another embodiment of the present invention.

FIG. 12 illustrates a schematic of a system presenting for providing one or more proximity advertisements to a user located within a target range according to an embodiment of the present invention. A user may access various web pages, such as Web Page 201, through the Internet by entering URL 202. For example, the user may utilize a popular search engine to locate information on dog grooming or other topics of interest. While the user performs a search and views the results of the user's query on Main Pane 206, the user may also view various advertisements. Advertisements may be displayed as a Banner 204, or other form of advertisement. The present invention enables an entity, such as an incentive distributor, product or service provider, to display an advertisement (e.g., a banner) for a particular product or service. For example, Banner Advertisement 204 may display an advertisement for free dog food. If the user is interested in this product, the user may access the associated URL by clicking on the advertisement (e.g., banner) or by other modes of activation. Incentive Page 210 may then be displayed to the user.

Incentive Page 210 may display Product/Service logo 212, Incentive Information 214, and other displays. By activating the Product/Service Logo 212, the user may access the home page associated with the particular product or service. By activating Incentive Information 214, the user may view detailed information regarding the incentive, such as product or service information, restrictions, valid dates, and other information. A user may print the incentive by selecting Print Offer 216, purchase the product by selecting Buy Now 218, update/modify the user's profile by selecting Update Profile 220, and perform other operations. When a user selects Update Profile 220, the user may enter, modify or update user information, such as Location Information 232, Proximity Information 234, User Interest Information 236, and other types of profile information.

According to another embodiment of the present invention, a user may access user profile information at User Profile 230 by activating User Identifier 205 displayed on Web Page 201. This provides a direct link to user profile information from an advertisement, such as a banner advertisement 204. This feature enables users to quickly and easily modify user profile information. For example, if a user no longer owns a pet dog, the user may access the user's profile information from a dog food advertisement so that this user may no longer be targeted for dog-related incentives. If the user picks up a new interest or hobby, the user may specify such information in the user profile to receive more incentives regarding the user's new interest.

Location Information 232 may include the user's home address, work address, or other designated address. The addresses may include a street address, P.O. box, city, county, state, and zip code. Proximity Information 234 may include user identified proximity factors which define the distance the user is willing to travel to redeem incentives. For example, the user may specify a five mile radius from the user's home address. The user may also specify a county, shopping district, or other limitation. User Interest Information 236 may include information regarding categories of interest, such as products, services, restaurants, groceries, clothing, pets, and other areas of interest. User profile information may be used by Coupon Distributor 16 (or other product or service provider) to determine target ranges and other targeting factors. Targeting information including target ranges may then be conveyed to Online Promotion Service 102. Online Promotion Service 102 may distribute targeted advertisements to users at targeted locations in accordance with user defined proximity preferences, provider defined target ranges or both.

Incentive distributors (or other service or product providers) may specify a target range of advertisement exposure. For example, a grocery store owner may determine that within a 3 mile radius of the grocery store (e.g., a redemption facility), the owner may reach 100 potential customers and within a 10 mile radius the owner may reach 200 potential customers. The grocery owner may find it more economical to target the potential customers within the 3 mile radius instead of the 10 mile radius because there is a greater density of potential customers within the 3 mile radius. This provides a more economical solution to local advertisements.

In another example, a user's profile may identify a work address. A food service provider, such as a sandwich deli with limited hours of operation (e.g., during lunch time), may target addresses which are specified as work addresses that are located within walking distance to the deli. The deli may also provide greater incentives to these addresses, such as special lunch time discounts.

Figure 13:
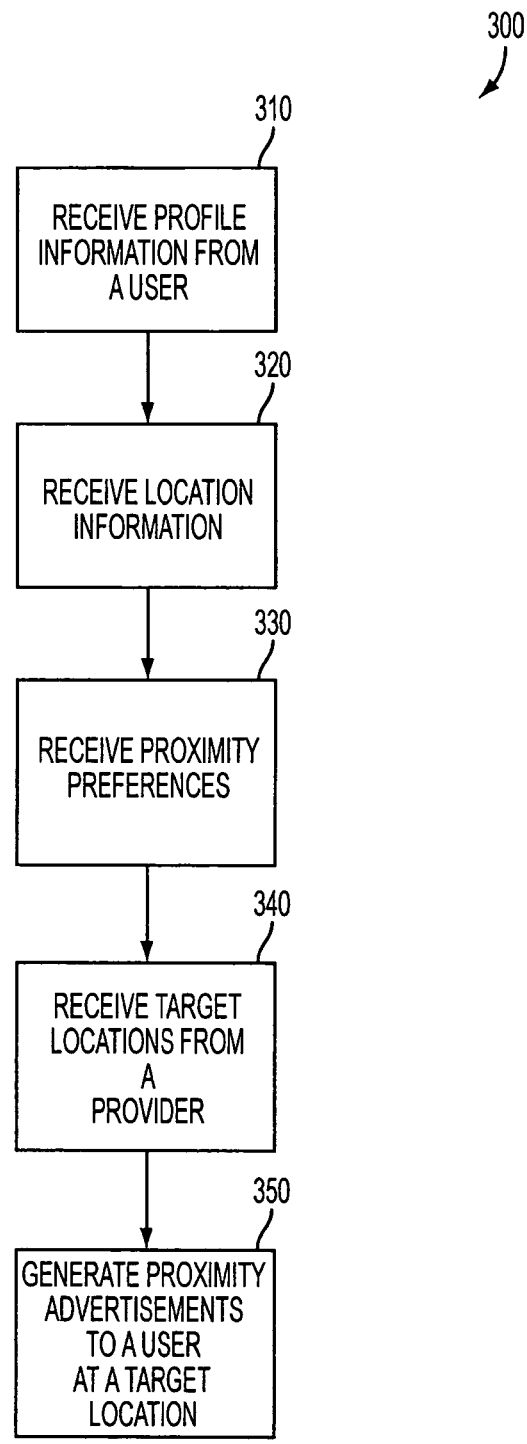
FIG. 13 is a flowchart of a method for providing proximity advertisements according to another embodiment of the present invention.

FIG. 13 is flowchart of a method 300 for generating advertisements based on user profile information, location information, and proximity preferences according to an embodiment of the present invention. At step 310, an online promotion service may receive profile information from a user. Profile information may include information related to the user's shopping habits and preferences. In addition, the user may also submit information related to categories of interest, such as restaurants, groceries, pets, hobbies and other interests. At step 320, the online promotion service may receive information regarding a user's location. A user may identify one or more locations, such as a home address, one or more work addresses and other addresses of frequently visited locations. The submitted address may include a street address, P.O. box, city, county, zip code and other information. At step 330, the user may submit proximity preferences. This may include a range of distance the user is willing to travel to redeem incentives. For example, the user may define a 5 mile radius from the user's home address as the user's proximity preference. At step 340, a service or product provider or other authorized entity may submit one or more target ranges for advertisement exposure. For example, a pizza shop may present advertisements (e.g., banner ads) to users who are located within a 4 mile radius of the pizza shop. Based on the information submitted, the online promotion service may generate advertisements that are targeted to a user within a defined range where the range may be defined by the user, a provider, or both.

For example, Joe Smith may commute from his home in Reston, Va. to Washington, D.C. In his profile information, Joe Smith may specify interest in receiving incentives, such as coupons or other promotions, for Mexican restaurants within a five mile radius of his daily commute from Reston, Va. to Washington, D.C. San Pablo's Mexican Café may target potential consumers within a 10 mile range of the Café location in Virginia. San Pablo's Mexican Café may then submit a target range to an online promotion service of the present invention. Since Joe's proximity preference falls within San Pablo's target range, the online promotion service may present Joe with electronic banner ads (or other forms of advertisement) while he is online. Electronic banner ads may include special dining deals at San Pablo's Mexican Café. For example, San Pablo may offer free desert night on Thursdays. This enables Joe Smith to receive advertisements for incentives about products and services that are of most interest to Joe and conveniently redeemable. In addition, service or product providers may effectively target potential consumers who are located within a close proximity to an associated place of redemption.

Figure 14:
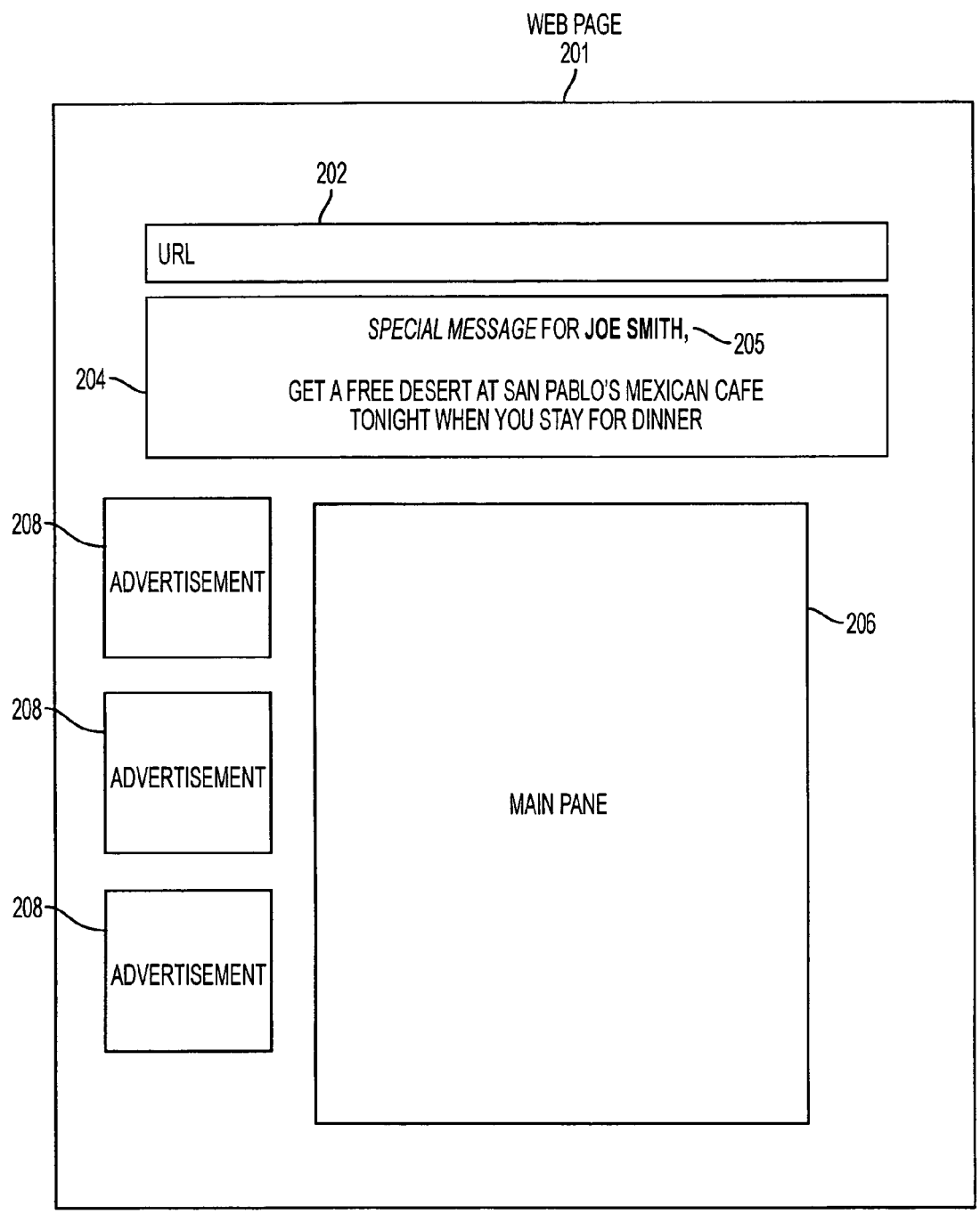
FIG. 14 illustrates an example of a direct link to user profile information according to an embodiment of the present invention.

FIG. 14 illustrates an example of a direct link to user profile information according to an embodiment of the present invention. Web Page 201 displays an example of a banner advertisement 204 where a particular user is targeted. When the user selects User Identifier 205, the user may be directly linked to user profile information. At a user profile page, the user may update and modify user profile information, such as location information, proximity information, user interest information and other information. In addition, other forms of advertisement may also be displayed, as illustrated by 208.

For example, Joe Smith may want to try more Thai restaurants in the area. By activating the User Identifier 205, Joe Smith may view his profile information and update his preferences to include Thai restaurants. He may even delete Mexican restaurants as his preferred type of cuisine and replace it with Thai restaurants.

Other embodiments and uses of the invention will be apparent to those skilled in the art from consideration of the specification and practice of the invention disclosed herein. The specification and examples should be considered exemplary only.

What is claimed is:

1. A computer-implemented system for generating advertisements based on user profile information, the system comprising:
    at least one server, the at least one server configured to:
        receive user profile information from a user via a user device operatively connected to the at least one server via a communication link;
        receive location information for the user, the location information comprising a start location and a destination location defining a travel route along which the user is willing to receive advertisements related to providers that are within a specified proximity of a given location along the travel route;
        receive proximity preference information that includes the specified proximity;
        generate at least one advertisement for a particular product or service for the user based on the user profile information, the location information, and the proximity preference information, wherein the at least one advertisement is associated with a provider of the particular product or service that is located within the specified proximity of the given location along the travel route; and
        transmit the at least one advertisement to the user device via the communication link, wherein the at least one advertisement includes a direct selectable link to the user profile information.

2. The system of claim 1, wherein the at least one advertisement includes a selectable link to content about an incentive associated with the at least one advertisement.

3. The system of claim 1, wherein the direct selectable link to the user profile information comprises a user identifier.

4. The system of claim 3, wherein the user identifier is the name of the user.

5. The system of claim 1, wherein the location information comprises an address associated with the user for the start location or the destination location.

6. The system of claim 1, wherein the proximity preference information comprises a distance range, specified by the user, that the user is willing to travel from the given location along the travel route to redeem an incentive.

7. The system of claim 1, wherein the proximity preference information comprises a distance range, specified by the provider, that the provider is targeting as a range of advertisement exposure such that when a distance between the given location along the travel route and an identified redemption facility associated with the provider is within the distance range specified by the provider and the specified proximity, the at least one advertisement related to the provider is generated.

8. The system of claim 6, wherein the user-specified distance range comprises a radius, in miles, from the given location along the travel route.

9. The system of claim 7, wherein the provider-specified distance range comprises a radius, in miles, from the identified redemption facility associated with the provider.

10. The system of claim 1, wherein the at least one server is further configured to:
    receive an indication that the at least one advertisement has been selected or activated; and
    responsive to the received indication, communicate an incentive page that includes information that describes the particular product or service, an incentive related to the particular product or service, and the direct selectable link to the user profile information such that both the at least one advertisement and the incentive page includes the direct selectable link.

11. The system of claim 1, wherein the proximity preference information comprises a distance range specified by the provider, and wherein the at least one server is further configured to:
    determine a first price associated with a first distance range for which the provider would like advertising exposure, wherein the at least one advertisement is transmitted to the user device when a distance between a location of an identified redemption facility associated with the provider and the given location along the travel route is within the first distance range;
    determine a second price associated with a second distance range for which the provider would like advertising exposure, wherein the at least one advertisement is transmitted to the user device when a distance between the location of the identified redemption facility associated with the provider and the given location along the travel route is within the second distance range; and cause the first price or the second price to be offered to the provider based on a provider selection of the first distance range or the second distance range.

12. The system of claim 1, wherein the at least one server is further configured to:

determine a value of an incentive for the particular product or service based on a distance between an identified redemption facility associated with the provider and the given location along the travel route such that the determined value of the incentive varies based on the distance; and include the incentive and the value of the incentive with the at least one advertisement based on a distance between an identified redemption facility associated with the provider and the given location along the travel route.

13. The system of claim 12, wherein the value of the incentive increases as the distance decreases.

14. A method for generating advertisements based on user profile information, the method comprising:

receiving, at a server, user profile information from a user via a user device in operative communication with the server via a communications link;

storing the received user profile information in a database;

receiving location information for the user, the location information comprising a start location and a destination location defining a travel route along which the user is willing to receive advertisements related to providers that are within a specified proximity of a given location along the travel route;

receiving proximity preference information that includes the specified proximity;

generating, by the server, at least one advertisement for a particular product or service for the user based on the user profile information, the location information, and the proximity preference information, wherein the at least one advertisement is associated with a provider of the particular product or service that is located within the specified proximity of the given location along the travel route; and transmitting the at least one advertisement from the server to the user device via the communications link, wherein the at least one advertisement includes a direct selectable link to the user profile information.

15. The method of claim 14, wherein the at least one advertisement includes a selectable link to content about an incentive associated with the at least one advertisement.

16. The method of claim 14 wherein, the direct selectable link to the user profile information comprises a user identifier.

17. The method of claim 16, wherein the user identifier is the name of the user.

18. The method of claim 14, wherein the location information comprises an address associated with the user for the start location or the destination location.

19. The method of claim 14, wherein the proximity preference information comprises a distance range, specified by the user, that the user is willing to travel from the given location along the travel route to redeem an incentive.

20. The method of claim 14, wherein the proximity preference information comprises a distance range, specified by the provider, that the provider is targeting as a range of advertisement exposure such that when a distance between the given location along the travel route and an identified redemption facility associated with the provider is within the distance range specified by the provider and the specified proximity, the at least one advertisement related to the provider is generated.

21. The method of claim 19, wherein the user-specified distance range comprises a radius, in miles, from the given location along the travel route.

22. The method of claim 20, wherein the provider-specified distance range comprises a radius, in miles, from the identified redemption facility associated with the provider.

23. A computer-implemented system for generating at least one advertisement relating to a search query, the system comprising:

at least one server, the at least one server configured to:

receive a search query from a user regarding a topic of interest to the user;

generate search results in response to the search query;

generate at least one advertisement for a particular product or service for the user that is related to one or more of the generated search results, and that is additionally based on user profile information stored for the user and location information that includes a start location and a destination location defining a travel route along which the user is willing to receive advertisements related to providers that are within a specified proximity of a given location along the travel route, and wherein the at least one advertisement is associated with a provider of the particular product or service that is located within the specified proximity of the given location along the travel route;

generate a display that includes the generated search results and the at least one advertisement for communication to the user, wherein the at least one advertisement includes a direct selectable link to the stored user profile information; and associate at least one incentive with the at least one advertisement.

24. The system of claim 23, wherein the at least one incentive is a targeted incentive.

25. The system of claim 23, wherein the at least one incentive is a geographically targeted incentive.

26. The system of claim 23, wherein the at least one incentive is targeted based on a zip code associated with the user.

27. The system of claim 23, wherein the at least one incentive is targeted based on the user profile information.

28. The system of claim 23, wherein the at least one incentive is targeted based on user-specific information.

29. The system of claim 23, wherein the at least one incentive is targeted based on prior user action.

30. The system of claim 23, wherein the at least one incentive is targeted based on user location.

31. The system of claim 23, wherein the at least one incentive is targeted based on user proximity to a particular location.

32. The system of claim 23, wherein the at least one incentive is targeted based on a predetermined range of distances.

33. The system of claim 23, wherein the at least one incentive is targeted based on the user profile information and proximity information.

34. The system of claim 23, wherein the at least one incentive is targeted based on proximity information received from the user.

35. The system of claim 23, wherein the at least one incentive is targeted based on proximity information received from an incentive provider.

36. The system of claim 23, wherein the at least one incentive is targeted based on proximity information received from both the user and an incentive provider.

37. The system of claim 23, wherein the at least one incentive is targeted based on user profile information, user location information, and proximity preference information.

38. The system of claim 23, wherein the at least one server is further configured to:
   determine a retail location having availability of a product or service of interest to a user, and wherein the at least one incentive is targeted based on user location information relative to the retail location.

39. The system of claim 23, wherein the at least one server is further configured to:
   determine a retail location having availability of a product or service of interest to a user, and wherein the at least one incentive is targeted based on user location information relative to the retail location and proximity preference information.

40. The system of claim 23, wherein the at least one advertisement includes a selectable link that enables the user to display the at least one incentive.

41. The system of claim 23, wherein the at least one server is further configured to:
   receive user location information.

42. The system of claim 23, wherein the at least one server is further configured to:
   receive user location information from the user.

43. The system of claim 23, wherein the at least one server is further configured to:
   receive user location information from a device associated with the user.

44. The system of claim 23, wherein the user profile information includes information regarding at least one category of interest to the user, and wherein the at least one advertisement relates to the at least one category.

45. A computer-implemented system for generating advertisements based on user profile information and travel route information, the system comprising:
   at least one server, the at least one server configured to:
   receive user profile information for a user;
   receive location information for the user, the location information comprising a start location and a destination location defining a travel route along which the user is willing to receive advertisements related to providers that are within a specified proximity of a given location along the travel route;
   receive proximity preference information that includes: (i) the specified proximity and (ii) a distance range specified by a provider that the provider is targeting as a range of advertisement exposure;
   determine that a distance between the given location along the travel route and an identified redemption facility associated with the provider is within both the distance range specified by the provider and the specified proximity;
   generate at least one advertisement for a particular product or service for the user based on the user profile information, the location information, and the determination that the distance between the given location along the travel route and the identified redemption facility associated with the provider is within both the distance range specified by the provider and the specified proximity, wherein the at least one advertisement is associated with the provider of the particular product or service that is located within the specified proximity of the given location along the travel route; and
   transmit the at least one advertisement to the user.

* * * * *